A. KELLER-DORIAN.
FILM FOR PHOTOGRAPHIC PROJECTIONS IN COLORS.
APPLICATION FILED DEC. 29, 1914.

1,214,552.   Patented Feb. 6, 1917.

Witnesses

Inventor:
Albert Keller-Dorian.
by his Attorney

UNITED STATES PATENT OFFICE.

ALBERT KELLER-DORIAN, OF LYON, FRANCE.

FILM FOR PHOTOGRAPHIC PROJECTIONS IN COLORS.

1,214,552.  Specification of Letters Patent.  Patented Feb. 6, 1917.

Application filed December 29, 1914. Serial No. 879,476.

*To all whom it may concern:*

Be it known that I, ALBERT KELLER-DORIAN, a citizen of the French Republic, residing at Lyon, in France, have invented certain new and useful Improvements in Films for Photographic Projections in Colors, of which the following is a specification.

This invention comprises improvements in films for photographic projections in colors.

The films are prepared by engraving microscopical points, ranging from 100 to 500 per square millimeter, on a plate or cylinder and in molding or cutting sensitized photographic films by means of the said engraved plate or cylinder for the purpose of reproducing images of objects in the colors of nature.

The engraving on the cylinder or plate is obtained by known means, that is to say, by means of very accurate dividing and cutting machines. This engraving on the plate or cylinder may be sunk or in relief, the minute pits or bosses formed being, for example, of substantial hemispherical shape. The dots or points can be arranged in lines and in regular formation, or they can be engraved irregularly.

Figure 1:
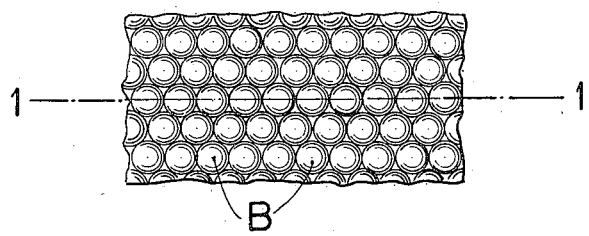
Figure 2:
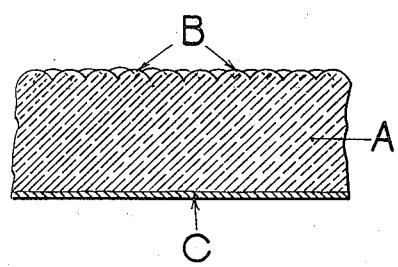

In the annexed drawings: Figure 1 is an elevation enlarged about 100 diameters of a portion of a film forming the object of the invention. Fig. 2 is a section on line 1—1 of Fig. 1.

The engraved plate or cylinder is intended for impressing or figuring the photographic films A, which are thereby provided with an infinite number of small cells B, each of which may be considered as forming an objective. Each of these objectives will give on the sensitive layer C a complete image of the apparent disk of the principal view taking objective. Any color selecting filter, which would cause the disk of the principal objective to appear in the form of a colored zone would permit, by means of the said lenticulated films of registering at each point of the image, colored rays, as they would be allowed to pass through the color filter. The direction of the luminous rays being reversible, these films used in a projecting apparatus, similar to the taking apparatus would reproduce the image in natural colors on a screen.

The lenticulating of the films may be effected by deep compression of the plastic substance of the film by using a pressing roller. In this case each of the engraved points should be cut so as to have a shape similar to each of the refracting elements of the film.

If elements of simple lenticular shape are to be obtained, this result could be facilitated by the employment of an elastic cylinder press; in this case the depth of cutting of engraving could be greater than the impression required. The surface tension of the film would in this case determine the pressure to be exerted on the engraved cylinder and the plasticity of the film would also be taken into account, this plasticity could be modified by means of heat or in any other manner.

What I claim as my invention and desire to secure by Letters Patent of the United States is:—

Lenticulated films for color photography, comprising in combination a transparent support having a large number of minute juxtaposed objectives upon one of its faces, and a sensitive layer upon its other surface.

In witness whereof I have signed this specification in the presence of two witnesses.

ALBERT KELLER-DORIAN.

Witnesses:
 JEAN GERMAIN,
 MARIUS HERMAZ.